March 5, 1940.  I. V. COLE  2,192,826

CIRCUIT TESTING BOARD

Filed June 10, 1939  2 Sheets-Sheet 1

INVENTOR.
IRVING V. COLE
BY A. C. Bierman
ATTORNEY.

March 5, 1940.  I. V. COLE  2,192,826
CIRCUIT TESTING BOARD
Filed June 10, 1939  2 Sheets-Sheet 2
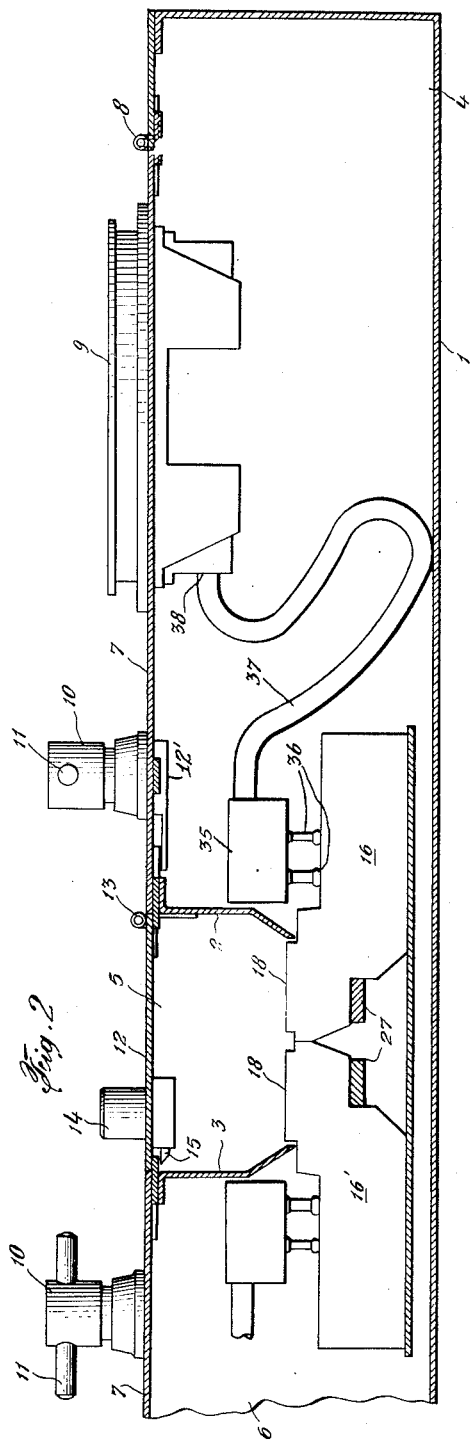
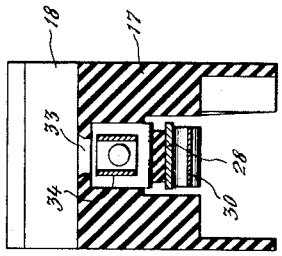
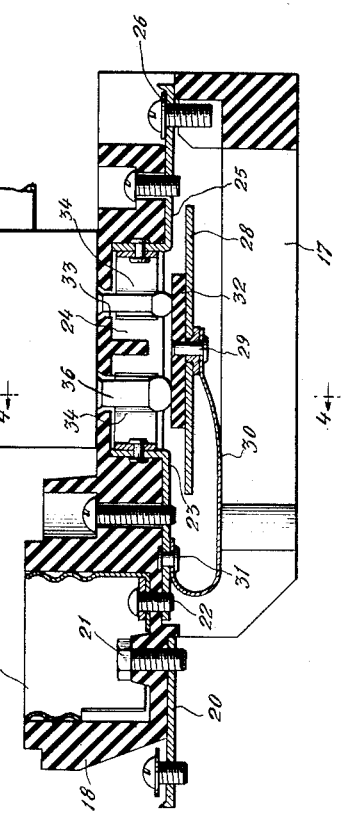
INVENTOR.
IRVING V. COLE
BY
ATTORNEY.

Patented Mar. 5, 1940

2,192,826

UNITED STATES PATENT OFFICE 2,192,826

CIRCUIT TESTING BOARD

Irving V. Cole, Newark, N. J.

Application June 10, 1939, Serial No. 278,486

11 Claims. (Cl. 175—183)

This invention is directed to testing devices, more particularly to a device whereby testing meters or the like may be introduced into a circuit without interrupting the same at any time.

In certain instances, it is highly desirable to be able to introduce a special meter into a circuit for the purpose of testing the consumption in said circuit. This applies, for example, to a case where in an apartment house there are a considerable number of users of electricity. In some such cases, none of the current is metered to the individual tenants and it becomes desirable to be able to introduce into each of the individual circuits a test meter for a relatively short time. However, in so doing, it is essential that the current be not interrupted even for a small fraction of a minute, as such an interruption might interfere with the operation of electrical devices in the circuit, such as an electric clock and the like.

In view thereof, it is among the objects of the present invention to provide a device which is simple in construction, readily installed, and which is capable of allowing the introduction of a meter into the circuit with dispatch and convenience and without interruption of the current.

It is also among the objects of the present invention to provide a panel board or box construction containing a considerable number of such devices and in which the arrangement is such that ready and easy access may be had to the various elements, and at the same time they may be protected from outside manipulation.

In practicing the invention, there is provided an insulating block which normally carries the ordinary socket for a fuse plug. The current is caused to flow in said block through suitable arranged conductors connected respectively to the bus bar or feed line and to the individual circuit. A gap is provided in the connection which is bridged by a contact member, the latter being yieldably held in place by a spring or the like. Directly superimposed above said contact member is a set of sockets into which a test plug may be introduced. The proportioning of the parts is such that when the test plug is first introduced, it forms a circuit in parallel to that passing through the contact member and thus insures against interruption of service. As the plug is pushed completely into its sockets, the free ends of the plug projections engage the contact member in such a manner as to break the circuit therethrough. Thereby, all of the current is now caused to pass through the test plug and the meter or the like secured thereto.

In the accompanying drawings, constituting a part hereof, and in which like reference characters indicated like parts, Fig. 1 is a fragmentary, top plan view of a box containing the improvements of the present invention, some parts being broken away for clearness;

Fig. 2 is a fragmentary, vertical, cross-sectional view taken along the line 2—2 of Fig. 1;

Fig. 3 is a vertical, cross-sectional view taken through one of the individual devices constituting a part of the structure, of Fig. 1; and Fig. 4 is a transverse, cross-sectional view taken along the line 4—4 of Fig. 3.

Figure 1:
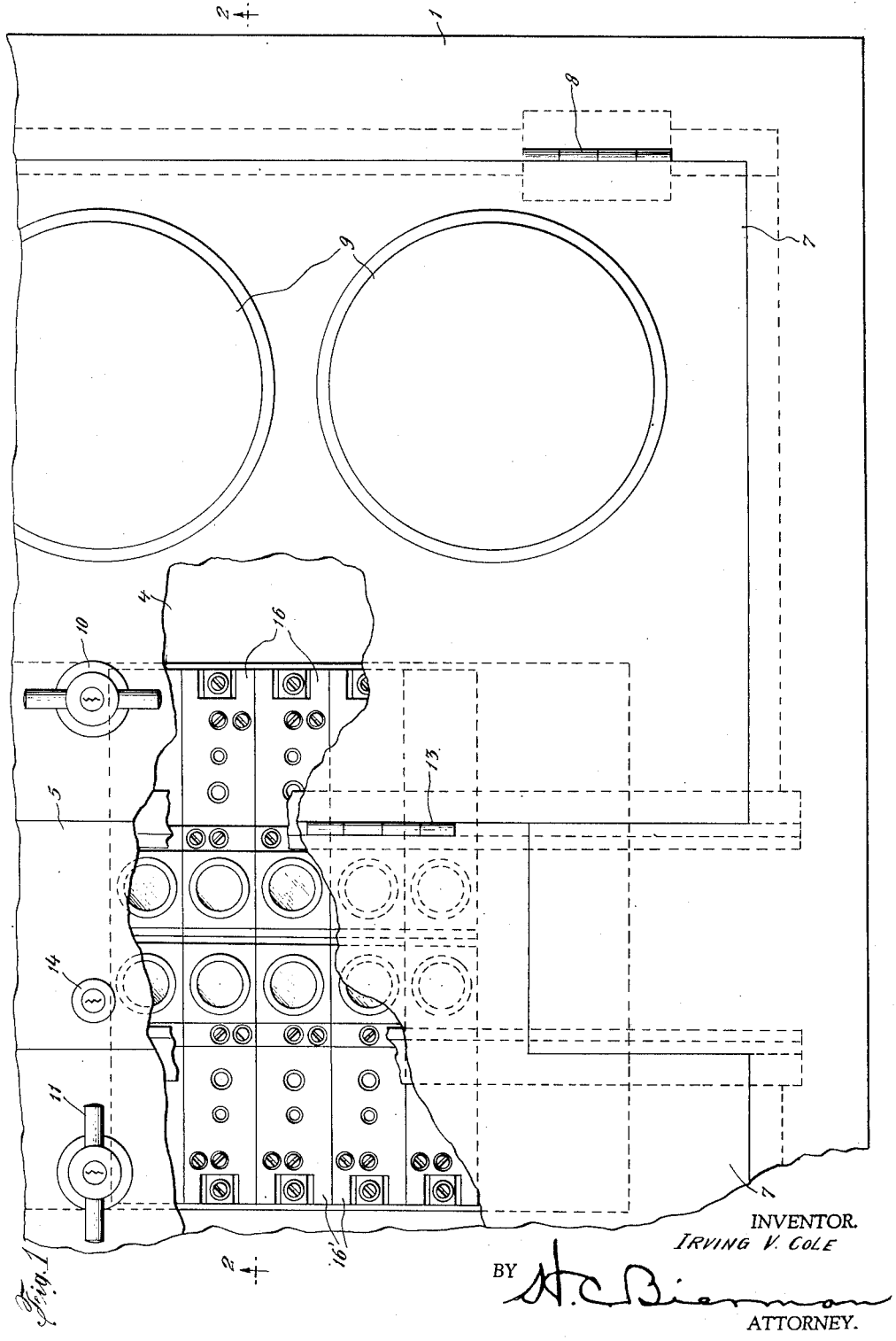

The structure comprises a box 1 having centrally located therein and extending across the same a pair of partitions 2 and 3. Said partitions form a series of compartments 4, 5 and 6, the compartments 4 and 6 being at the ends and being substantial duplicates of each other, and the compartment 5 being of smaller extent and intended to provide access to fuse plugs. Covers 7 are provided for compartments 4 and 6, being hinged at 8 and having meter sockets 9 formed therein. Locks 10 having operating handles 11 are provided on said covers opposite to hinges 8, whereby by means of latch 12' the covers 7 may be locked. The central compartment 5 has a cover 12 hinged at 13 and bearing lock 14 having latch 15 to similarly lock the same against outside or undue interference.

Within the box is provided two rows of test plugs 16 and 16' in parallel relationship, as most clearly shown in Fig. 1. Each of these devices comprises an insulating body 17 of suitable material, such as a molded phenol formaldehyde condensation product or the like, having an extension 18 at one end. In the latter there is provided a recess aligned with contact member 19 for the reception of a fuse plug. A conducting bar 20 is held in place by screw 21, the head of which is within the socket and provides a second contact for the fuse plug.

The shell 19 is secured by screw 22 to conductor 23, terminating at one side of gap 24 in block 17. A second conductor 25 at the opposite end of gap 24 extends as shown in Fig. 3 to point 26, where it may be connected to the house circuit. As shown in Fig. 2 a pair of bus bars 27 is secured to bars 20 of the series of devices 16 and 16' respectively.

The gap 24 is bridged by contact member 28, having a pivot 29 centrally located therein and holding one end of spring 30 therein in such a manner that the connection is sufficiently loose to allow contact member 28 to readily and completely seat itself upon conductors 23 and 25. The opposite end of spring 30 is secured at 31 to conductor 23. An insulating member 32 is secured by pin 29 to the top face of contact member 28 for a purpose to be later explained.

Openings 33 in the top of block 17 allow access to the gap 24. There is inserted therein a pair of contact shells 34 which are connected respectively to conductors 23 and 25. A test plug 35 has dependent members 36 connected to conductors within the same, said conductors being encased in cable 37 and the extreme end thereof being secured at 38 in meter socket 9, whereby a connection to a meter may be obtained.

In the operation of the device, assuming that the current is passing from bus bar 27 through bar 20, the fuse plug (not shown), conductor 23, contact member 28, conductor 25, and then to the house circuit, it is desired to introduce a test meter into the same. Therefore, a meter is inserted in meter socket 9 and projections 36 of test plug 35 are introduced into openings 33. This causes a circuit to be formed from conductor 23 through one projection 36 to the meter in socket 9 and back through the other projection 36, and thence to conductor 25. As the test plug 35 is brought into its final position, as shown in dotted lines in Fig. 3, the extreme ends of projections 36 will contact with insulating member 32 and push contact member 28 away from conductors 23 and 25, as shown in Fig. 3, thus breaking the main circuit and compelling the current to pass through the test meter. When the test is over, the test plug 35 may be removed. In the first movement thereof, the ends of projections 36 are taken out of contact with insulation 32, allowing the action of spring 30 to cause contact member 28 to contact with conductors 23 and 25. Thereby, the parallel circuit is again formed and there is no interruption of service. Upon the complete removal of test plug 35, the parallel circuit is broken but the current continues without interruption.

The present construction has a considerable number of advantages in that it is simple and because of the form thereof, the operation becomes automatic and no interruption of current takes place at any time. It is also possible because of the present construction to arrange a large series of units in a single box so as to give great convenience of operation. Only a relatively small number of test meters are necessary for the successive testing of a large number of individually used circuits. None of the test meter connections are visible because of the locked covers and therefore outsiders cannot determine which of the house circuits are being tested at any time. At the same time, the central compartment 5 being closed by an individual cover, allows ready access to the fuse plug sockets for the replacement of burnt out fuses and for other purposes. Because the individual blocks 17 are placed end to end with the projections 18 in contact, a very compact arrangement is thereby obtained.

If desired, there may be introduced into each individual circuit a switch whereby the current may be cut off altogether from an empty apartment, for example. This may be accomplished by inserting a tumbler switch or its equivalent between the bus bar and the test plug. A convenient arrangement is obtained by spacing test plugs 16 and 16' a substantial distance apart and connecting a pair of switches between said plugs and the bus bars, one switch to plug 16 and the other to plug 16'. The compartment 5 would be enlarged to accommodate both the switches and fuse plugs.

Although I have described a test plug having two fingers or projections, one larger than the other to prevent reversal of the current through the meter, I may use a plug having only one projection. In such case, there is provided an outer annular member fitting into socket 34, an inner annular insulating member, and a central conductor adapted to directly contact with plate 28, which is suitably modified. By the term "a pair of projections" used in the claims, I include a construction, such as mentioned above, where both projections are in a single finger. The meters may be placed within the compartments 4 and 6 instead of in the covers thereof, and this is intended to be included in the language of the claims.

What I claim is:

1. A circuit testing device comprising an insulating base, a pair of terminals adapted to be connected into an electrical circuit, a gap between said terminals, a contact member bridging said gap, means for yieldingly holding said member in contact closing position, a pair of sockets in said base between said terminals, each of said sockets being electrically connected to its respective terminal, and a test plug having a pair of conducting projections adapted to fit into said sockets, whereby said plug upon being inserted first provides a parallel circuit connection and thereafter breaks the connection of said contact member.

2. A circuit testing device comprising an insulating base, a pair of terminals adapted to be connected into an electrical circuit, a gap between said terminals, a contact member bridging said gap, means for yieldingly holding said member in contact closing position, a pair of sockets in said base between said terminals, each of said sockets being electrically connected to its respective terminal, an insulating member secured to said contact member and interposed between the latter and said sockets, and a test plug having a pair of conducting projections adapted to fit into said sockets, whereby said plug upon being inserted first provides a parallel circuit connection and thereafter breaks the connection of said contact member.

3. A circuit testing device comprising an insulating base, a pair of terminals adapted to be connected into an electrical circuit, a gap between said terminals, a contact member bridging said gap, means for yieldingly holding said member in contact closing position including a spring having one portion secured to said base and another portion secured to the central part of said contact member, a pair of sockets in said base between said terminals, each of said sockets being electrically connected to its respective terminal, and a test plug having a pair of conducting projections adapted to fit into said sockets, whereby said plug upon being inserted first provides a parallel circuit connection and thereafter breaks the connection of said contact member.

4. A circuit testing device comprising an insulating base, a pair of terminals adapted to be connected into an electrical circuit, a gap between said terminals, a contact member bridging said gap, means for yieldingly holding said member in contact closing position loosely secured thereto to permit positive seating thereof on said terminals, a pair of sockets in said base between said terminals, each of said sockets being electrically connected to its respective terminal, and a test plug having a pair of conducting projections adapted to fit into said sockets, whereby said plug upon being inserted first provides a parallel circuit connection and thereafter breaks the connection of said contact member.

5. A circuit testing device comprising an insulating base, a pair of terminals adapted to be connected into an electrical circuit, a gap between said terminals, a contact member bridging said gap, means for yieldingly holding said member in contact closing position, a pair of sockets in said base between said terminals, each of said sockets being electrically connected to its respective terminal, a fuse plug socket in said base adjacent one of said terminals and electrically connected thereto, and a test plug having a pair of conducting projections adapted to fit into said sockets, whereby said plug upon being inserted first provides a parallel circuit connection and thereafter breaks the connection of said contact member.

6. A circuit testing board comprising a box having a plurality of compartments, a series of circuit testing plug socket devices in alignment therein, a bus bar electrically connected to said series, test meter sockets adapted to hold meters on the cover of said box, said cover being hinged, each of said devices having circuit interrupting means and a pair of test plug sockets for holding a test plug located in the same compartment as said meter sockets, whereby when the cover is opened access is had so that a meter may be connected by means of said test plug to any one of said devices.

7. A circuit testing board comprising a box having a plurality of compartments, a series of circuit testing plug socket devices in alignment therein, a bus bar electrically connected to said series, test meter sockets adapted to hold meters on the cover of said box, said cover being hinged, each of said devices having circuit interrupting means and a pair of test plug sockets for holding a test plug located in the same compartment as said meter sockets, whereby when the cover is opened access is had so that a meter may be connected by means of said test plug to any one of said devices, each of said devices having a fuse plug socket all of which sockets are in alignment and are located in a separate compartment in said box.

8. A circuit testing board comprising a box, two series of circuit testing plug socket devices therein, each of said devices having circuit interrupting means and a pair of test plug sockets, a fuse plug socket at one end of each of said devices, said series of devices being in alignment with said fuse sockets in adjacent relation, a central compartment in said box, said devices being so arranged that said fuse sockets lie in said compartment, two end compartments, the test sockets of each series of said devices lying in their respective end compartments, test meter sockets adapted to hold meters in each end compartment, a test plug adapted to be connected to a meter and to one of said devices in each end compartment.

9. A circuit testing board comprising a box, two series of circuit testing plug socket devices therein, each of said devices having circuit interrupting means and a pair of test plug sockets, a fuse plug socket at one end of each of said devices, said series of devices being in alignment with said fuse sockets in adjacent relation, a central compartment in said box, said devices being so arranged that said fuse sockets lie in said compartment, two end compartments, the test sockets of each series of said devices lying in their respective end compartments, test meter sockets adapted to hold meters in each end compartment, a test plug adapted to be connected to a meter and to one of said devices in each end compartment, and an independently operable cover for each of said compartments.

10. A circuit testing device comprising an insulating base, a pair of terminals adapted to be connected into an electrical circuit, a gap between said terminals, a contact member bridging said gap, means for yieldingly holding said member in contact closing position, a socket in said base between said terminals and electrically connected to a terminal, and a test plug having conducting projections adapted to fit into said socket, whereby said plug upon being inserted first provides a parallel circuit connection and thereafter breaks the connection of said contact member.

11. A circuit testing board comprising a box having a plurality of compartments, covers on said compartments, a series of circuit testing plug socket devices in alignment therein, a bus bar electrically connected to said series, test meter sockets adapted to hold meters in said box, each of said devices having circuit interrupting means and a test plug socket for holding a test plug located in the same compartment as said meter sockets, whereby when the cover is opened access is had so that a meter may be connected by means of said test plug to any of said devices.

IRVING V. COLE.